United States Patent
Minamino

(10) Patent No.: US 8,054,517 B2
(45) Date of Patent: Nov. 8, 2011

(54) IMAGE PROCESSING APPARATUS AND IMAGE PROCESSING METHOD

(75) Inventor: Katsushi Minamino, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 688 days.

(21) Appl. No.: 12/244,098

(22) Filed: Oct. 2, 2008

(65) Prior Publication Data

US 2009/0122369 A1    May 14, 2009

(30) Foreign Application Priority Data

Nov. 9, 2007    (JP) .................................. 2007-291532

(51) Int. Cl.
H04N 1/04    (2006.01)
(52) U.S. Cl. ......... 358/505; 358/520; 358/462; 358/521
(58) Field of Classification Search .................. 358/505, 358/520, 462, 521, 518
See application file for complete search history.

(56) References Cited

U.S. PATENT DOCUMENTS

| | | |
|---|---|---|
| 5,786,906 A | 7/1998 | Shishizuka |
| 7,529,007 B2 * | 5/2009 | Angal et al. ................. 358/520 |

FOREIGN PATENT DOCUMENTS

| | | |
|---|---|---|
| JP | 03-053670 A | 3/1991 |
| JP | 10-032722 A | 2/1998 |
| JP | 2000-022895 A | 1/2000 |
| JP | 2004-336714 A | 11/2004 |

OTHER PUBLICATIONS

Official Communication issued in corresponding Japanese Patent Application No. 2007-291532, mailed on Feb. 16, 2010.
Official Communication issued in corresponding Japanese Patent Application No. 2007-291532, mailed on Nov. 2, 2009.

* cited by examiner

Primary Examiner — Houshang Safaipour
(74) Attorney, Agent, or Firm — Keating & Bennett, LLP

(57) ABSTRACT

An image processing method and apparatus includes a color space conversion unit arranged to convert pixel data scanned by a line sensor of each color component into first chromaticity data and second chromaticity data, and an achromatic color determining unit arranged to determine whether or not the pixel data is achromatic. The achromatic color determining unit includes a comparison unit arranged to compare an achromatic color determination area with the pixel data in a color space defined by orthogonal coordinates having each chromaticity data as a coordinate axis. The achromatic color determination area is an elongated area that includes a coordinate origin of the color space, that is set based on a coordinate position of a false color acquired by using a size and position of displacement of the scanning position of each color component generated in accordance with the scanning speed, and that extends in an opposite direction from the coordinate origin.

7 Claims, 18 Drawing Sheets

SCANNING POSITION SCANNED AT 112 PERCENT MAGNIFICATION

SCANNING POSITION SCANNED AT 118 PERCENT MAGNIFICATION

PIXEL DATA SCANNED AT 118 PERCENT MAGNIFICATION

SCANNING POSITION SCANNED AT 123 PERCENT MAGNIFICATION

PIXEL DATA SCANNED AT 123 PERCENT MAGNIFICATION

IMAGE PROCESSING APPARATUS AND IMAGE PROCESSING METHOD

CROSS-REFERENCE TO RELATED APPLICATION

This application claims priority under 35 U.S.C. 119 to Japanese Patent Application No. 2007-291532, filed on Nov. 9, 2007, which application is hereby incorporated by reference in its entirety.

BACKGROUND OF THE INVENTION

1. Field of the Invention

The present invention relates to an image processing apparatus and an image processing method using the image processing apparatus, in which a plurality of line sensors corresponding to different color components simultaneously scan different scanning positions that are arranged on an original document at intervals predetermined in a sub-scanning direction.

2. Description of the Related Art

An image processing apparatus, such as a scanner device and a copier, scans an original document printed on a sheet of paper, for example, in order to convert the document into digital data, store the image data, and output the stored image data. The image processing apparatus receives, by using line sensors, reflected light that has been irradiated onto the original document, and performs image processing on the generated scanned data based on an amount of the received light.

The image processing apparatus includes the line sensors arranged to separately scan a red component (R component), a green component (G component), and a blue component (B component). The image processing apparatus generates the image data based on a voltage value acquired from the line sensors.

Each line sensor of Red, Green, and Blue (RGB) is arranged at predetermined intervals in a sub-scanning direction to scan a different scanning position of the original document. Therefore, each line sensor simultaneously scans at different scanning positions on the original document. Normally, the scanned data acquired by each line sensor is sequentially accumulated in a scanned data memory. The scanned data acquired by each line sensor at the same scanning position is read out from the scanned data memory and combined to generate RGB format pixel data of each line. Furthermore, by combining the combined RGB format pixel data, the image data of the original document is generated.

When a sampling period of the line sensors is constant, a magnification at which the original document is scanned is determined in accordance with the relative scanning speed in the sub-scanning direction of the original document and each line sensor. For example, when enlarging the original document, the scanning speed is decreased, and when reducing the original document, the scanning speed is increased.

Thus, since the scanning speed is changed in accordance with the magnification at which the original document is scanned, depending on the scanning speed, each line sensor may not scan an image on the same line of the original document. Accordingly, when the scanning position of each line sensor is displaced, and the pixel data is generated by combining the scanned data acquired by each line sensor, a false color is generated at a boundary where the pixel data changes from black to white, thereby deteriorating the quality of the image. A technique for correcting the pixel data when displacement of the scanned line is generated due to a change of magnification (i.e., because the magnification is changed from 100 percent magnification) is well known.

As for a determination of an achromatic color and chromatic color, a first well-known method determines the achromatic color by acquiring a maximum value and a minimum value from a signal of each color on which analog/digital conversion has been performed, and by acquiring a threshold value based on two-dimensional distribution of the maximum value and the minimum value. When the maximum value equals the minimum value, the first method determines the achromatic color. Therefore, in the two-dimensional distribution of the maximum value and the minimum value, a range surrounded by an experimentally acquired threshold curve and a straight line of "maximum value=minimum value" is set to be in a range of achromatic color.

Based on scanned data scanned by a line sensor that scans a G component, a second well-known method performs linear interpolation processing on the scanned data of an R component and B component scanned by other line sensors. The linear interpolation processing is performed when the R component scanning line sensor and the B component scanning line sensor scan by using the number of offset lines that includes a decimal, in other words, when the intervals at which each line sensor scans are not equal to the intervals of an integer number of lines. More specifically, the linear interpolation processing is performed on the R component scanned data and the B component scanned data by using the two pieces of scanned data acquired by scanning by using the integer number of offset lines that is close to the number of offset lines including the number of decimals. Then, the R component scanned data and the B component scanned data on which the linear interpolation processing has been performed and the G component scanned data on which the linear interpolation processing has not been performed are combined.

At this time, since the linear interpolation processing is performed on the R component and the B component, but is not performed on the G component, a contrast difference of the R component and the B component with respect to the G component becomes large. Moreover, since the G component becomes magenta when converted into the three primary colors of cyan (C), magenta (M), and yellow (Y), the magenta of the G component having a large contrast becomes intense when the scanned data is combined.

Accordingly, when setting an area for determining the achromatic color in a saturation distribution diagram that is based on color difference data, the color is determined by enlarging the achromatic color determination area in a magenta direction.

However, in a case of an achromatic color determining method of either the first method or of the second method, the false color cannot be sufficiently restrained.

Moreover, in the achromatic color determination of the first method, since the threshold curve experimentally acquired in the two-dimensional distribution of maximum value and minimum value is changed in accordance with a change of magnification, various problems can occur. For example, in the case of an image processing apparatus that can change the magnification by one percent, the experimental number used to acquire the threshold curve increases and the type of the threshold curves also increases, thereby increasing a data amount of the threshold value stored in the image processing apparatus.

Additionally, the achromatic color determination of the second method requires a cumbersome process of performing the linear interpolation processing on the R component scanned data and the B component scanned data in accordance with the change of magnification based on the G component scanned data.

SUMMARY OF THE INVENTION

In order to overcome the problems described above, preferred embodiments of the present invention provide an image processing apparatus that can reliably determine an achromatic color by using an event in which a false color is regularly changed and generated without performing a cumbersome process of linear interpolation and of experimentally setting a threshold value in accordance with a change of magnification even if an image scanning position of each line sensor is displaced due to the change of magnification.

According to a preferred embodiment of the present invention, an image processing apparatus includes an image scanning unit, a scanning speed control unit, a scanned data combining unit, a color space conversion unit, and an achromatic color determining unit. The image scanning unit includes a plurality of line sensors corresponding to different color components, and simultaneously scans different scanning positions on an original document at intervals predetermined in a sub-scanning direction. The scanning speed control unit controls a scanning speed in the sub-scanning direction of the scanning positions based on a set scanning resolution. The scanned data combining unit generates pixel data by combining, based on the scanning positions, each scanned data having a different color component from each scanned data output from the line sensors. The color space conversion unit converts the pixel data into first chromaticity data and second chromaticity data. The achromatic color determining unit determines whether or not the pixel data is achromatic. Further, the achromatic color determining unit is arranged to have a comparison unit that compares, with an achromatic color determination area, the pixel data that is in a color space defined by orthogonal coordinates having the first chromaticity data and the second chromaticity data as coordinate axes. The achromatic color determination area includes a coordinate origin of the color space, and is an elongated area extending in an opposite direction from the coordinate origin. The achromatic color determination area is set based on a coordinate position of a false color. The coordinate position of the false color can be acquired by using a size and position of displacement of the scanning position of each color component generated in accordance with the scanning speed.

According to a preferred embodiment of the present invention, a state of a false color at a boundary portion where black changes into white regularly changes in accordance with a change of magnification, i.e., in accordance with the scanning speed. The false color is generated when the scanning positions scanned by the three RGB line sensors are displaced, and when the pixel data is generated by combining the scanned data of the scanning positions where the displacement has occurred. For example, when an image is scanned by the R line sensor, G line sensor, and B line sensor in this order, a first state and a second state are generated in accordance with the magnification. In the first state, a mixed color of red (R) and yellow (Y) and a mixed color of blue (B) and cyan (C) are generated. In the second state, a mixed color of red (R) and magenta (M) and a mixed color of green (G) and cyan (C) are generated.

A longitudinal direction of the elongated achromatic color determination area can be determined in accordance with the first state and the second state. In other words, by using the first and second states, the longitudinal direction of the elongated achromatic color determination area is determined.

In the above-described configuration, when determining whether a target pixel is chromatic or achromatic, the elongated achromatic color determination area is set based on a generation state of the mixed colors, even if the image scanning position of each line sensor is displaced due to the change of magnification and the false color is generated at the boundary portion where the combined pixel data changes from black to white. Therefore, a false color portion can be easily and reliably determined as achromatic, thereby achieving high-quality image processing.

According to a preferred embodiment of the present invention, in addition to the above-described configuration, the image processing apparatus can change an inclination in the longitudinal direction of the achromatic color determination area based on the coordinate position of the false color. The coordinate position of the false color can be acquired by using a size and position of the displacement of the scanning position of each color component generated in accordance with the scanning speed.

According to a preferred embodiment of the present invention, a ratio of the mixed colors in the color space regularly changes in accordance with the scanning speed. That is, the ratio of the mixed colors changes based on the size and position of the displacement of the scanning position of each color component generated in accordance with the scanning speed. Thus, in the mixed colors generated in accordance with the change of magnification, the mixed colors that are positioned in an opposite direction from each other with respect to the coordinate origin of the orthogonal coordinates of the color space and are positioned farthest from the coordinate origin change the respective positions in the color space in accordance with the scanning speed. Accordingly, the inclination in the longitudinal direction can be set in accordance with the scanning speed such that the position of the mixed color that is farthest from the coordinate origin will be an edge portion in the longitudinal direction of the achromatic color determination area.

In such a configuration, the inclination in the longitudinal direction of the achromatic color determination area can be set in accordance with the scanning speed. Thus, the inclination in the longitudinal direction of the achromatic color determination area can be set in accordance with a different mixed color state, thereby reliably performing the determination of the achromatic color.

According to an additional preferred embodiment of the present invention, the image processing apparatus can change a length of the longitudinal direction of the achromatic color determination area in accordance with the coordinate position of the false color. The coordinate position of the false color can be acquired by using the size and position of the displacement of the scanning position of each color component generated in accordance with the scanning speed.

According to a preferred embodiment of the present invention, the ratio of the mixed colors in the color space regularly changes in accordance with the size and position of the displacement of the scanning position of each color component generated in accordance with the scanning speed. Thus, in the mixed colors generated in accordance with the change of magnification, the mixed colors that are positioned in the opposite direction from each other with respect to the coordinate origin of the orthogonal coordinates of the color space and are positioned farthest from the coordinate origin change the respective positions in the color space in accordance with the scanning speed. Accordingly, the length of the longitudinal direction can be set in accordance with the scanning speed such that the position of the mixed color that is farthest from the coordinate origin will be the edge portion in the longitudinal direction of the achromatic color determination area.

In such a configuration, the length of the longitudinal direction of the achromatic color determination area can be set in accordance with the scanning speed. Thus, the length of the longitudinal direction of the achromatic color determination area can be set in accordance with the different mixed color state, thereby reliably performing the determination of the achromatic color.

According to another preferred embodiment of the present invention, each distance extending in an opposite direction from the coordinate origin in the longitudinal direction is arranged to be longer than each distance extending in an opposite direction from the coordinate origin in a direction that is substantially perpendicular to the longitudinal direction of the achromatic color determination area in the image processing apparatus.

In the color space, a mixed color of red (R) and yellow (Y) and a mixed color of blue (B) and cyan (C) are generated in an opposite direction from each other with respect to the coordinate origin. A mixed color of red (R) and magenta (M) and a mixed color of green (G) and cyan (C) are generated in an opposite direction from each other with respect to the coordinate origin. Further, when the mixed color of red (R) and yellow (Y) and the mixed color of blue (B) and cyan (C) are generated, the mixed color of red (R) and magenta (M) and the mixed color of green (G) and cyan (C) are not generated. When the mixed color of red (R) and magenta (M) and the mixed color of green (G) and cyan (C) are generated, the mixed color of red (R) and yellow (Y) and the mixed color of blue (B) and cyan (C) are not generated.

Accordingly, by arranging the length of the longitudinal direction of the achromatic color determination area to be longer than the length of the direction that is substantially perpendicular to the longitudinal direction of the achromatic color determination area, the determination of the achromatic color can be more reliably performed.

According to a preferred embodiment of the present invention, the image processing apparatus includes an image scanning unit, a scanning speed control unit, a scanned data combining unit, and an achromatic color determining unit. The image scanning unit includes the plurality of line sensors corresponding to the different color components, and simultaneously scans the different scanning positions on the original document at intervals predetermined in the sub-scanning direction. The scanning speed control unit controls the scanning speed in the sub-scanning direction of the scanning positions based on the set scanning resolution. The scanned data combining unit generates the pixel data by combining, based on the scanning positions, each scanned data having the different color component from each scanned data output from the line sensors. The achromatic color determining unit determines whether or not the pixel data is achromatic. The achromatic color determining unit is arranged to determine whether or not the pixel data is achromatic based on the false color. The false color can be acquired by using the size and position of the displacement of the scanning position of each color component generated in accordance with the scanning speed.

As described above, the ratio of the mixed colors in the color space regularly changes in accordance with the size and position of the displacement of the scanning position of each color component generated in accordance with the scanning speed. Accordingly, the determination of the achromatic color can be easily performed based on the size and position of the displacement of the scanning position of each color component because the state of the false color is acquired in advance in accordance with the size and position of the displacement of the scanning position of each color component.

According to another preferred embodiment of the present invention, an image processing method includes a scanning speed controlling step, a pixel data generating step, a conversion step, and a determination step. The scanning speed controlling step controls a scanning speed in a sub-scanning direction of scanning positions in accordance with a set scanning resolution. The pixel data generating step generates pixel data by combining, based on the scanning positions, each scanned data having a different color component from each scanned data output from a plurality of line sensors, which correspond to the different color components. The conversion step converts the pixel data into first chromaticity data and second chromaticity data. The determination step determines whether or not the pixel data is achromatic. In a color space defined by orthogonal coordinates having the first chromaticity data and the second chromaticity data as coordinate axes, the determination step sets, as an achromatic color determination area, an elongated area that includes a coordinate origin of the color space and extends in an opposite direction from the coordinate origin, based on a coordinate position of a false color acquired by using a size and position of displacement of the scanning position of each color component generated in accordance with the scanning speed. Then, the determination step compares the achromatic color determination area with the pixel data in the color space so as to determine the achromatic color.

According to a preferred embodiment of the present invention, the image processing method includes the scanning speed controlling step, the pixel data generating step, and the determination step. The scanning speed controlling step controls the scanning speed in the sub-scanning direction of the scanning positions based on the set scanning resolution. The pixel data generating step generates the pixel data by combining, based on the scanning positions, each scanned data having the different color component from each scanned data output from the plurality of line sensors, which correspond to the different color components. The determination step determines whether or not the pixel data is achromatic based on the false color acquired by using the size and position of the displacement of the scanning position of each color component generated in accordance with the scanning speed. The false color is acquired by using the size and position of the displacement of the scanning position of each color component generated in accordance with the scanning speed.

According to a preferred embodiment of the present invention, the elongated achromatic color determination area that includes a generated false color portion can be easily set based on a mixed color state of the false colors generated due to the change of magnification even if the displacement is generated in the scanning position of each line sensor due to a change of magnification and the false color is generated at the boundary portion where the pixel data changes from black to white. As a result, the generated false color portion can be reliably determined as achromatic based on the elongated achromatic color determination area, thereby achieving high-quality image processing.

According to a preferred embodiment of the present invention, the mixed color state can be acquired based on the size and position of the displacement of the scanning position of each color component generated in accordance with the scanning speed even if the displacement is generated in the scanning position of each line sensor due to the change of magnification and the false color is generated at the boundary portion where the pixel data changes from black to white. Therefore, by determining the acquired mixed color state as the false color, the generated false color portion can be reliably determined as achromatic, thereby achieving high-quality image processing.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 17A illustrates a second achromatic color determination area at the magnification ranging from 101 to 106 percent, from 119 to 124 percent, from 126 to 131 percent, and from 144 to 149 percent. FIG. 17B illustrates a second achromatic color determination area at the magnification ranging from 107 to 118 percent, and from 132 to 143 percent.

FIG. 18A illustrates the second achromatic color determination area at the magnification ranging from 101 to 106 percent, from 119 to 124 percent, from 126 to 131 percent, and from 144 to 149 percent. FIG. 18B illustrates the second achromatic color determination area at the magnification ranging from 107 to 118 percent, and from 132 to 143 percent.

DETAILED DESCRIPTION OF PREFERRED EMBODIMENTS

Description will hereinafter be made of the preferred embodiments of an image processing apparatus according to the present invention with respect to FIG. 1 through FIG. 18B.

According to preferred embodiments of the present invention, a boundary portion where a black image of an original document changes from black to white, for example, is scanned by RGB line sensors in accordance with a magnification, each scanned data is combined to generate pixel data, each color component signal of the pixel data is converted into first color-difference data and second color-difference data, and a saturation distribution state is observed by acquiring orthogonal coordinates of a color space based on the color-difference data. As a result, as described above in the background of the invention, it has been found out that displacement is generated at scanning positions scanned by the three RGB line sensors in accordance with the magnification, that a false color is generated when the scanned data having the displacement is combined, and that a state of the false color at the boundary portion where the pixel data changes from black to white regularly changes in accordance with a change of the magnification.

Figure 1:
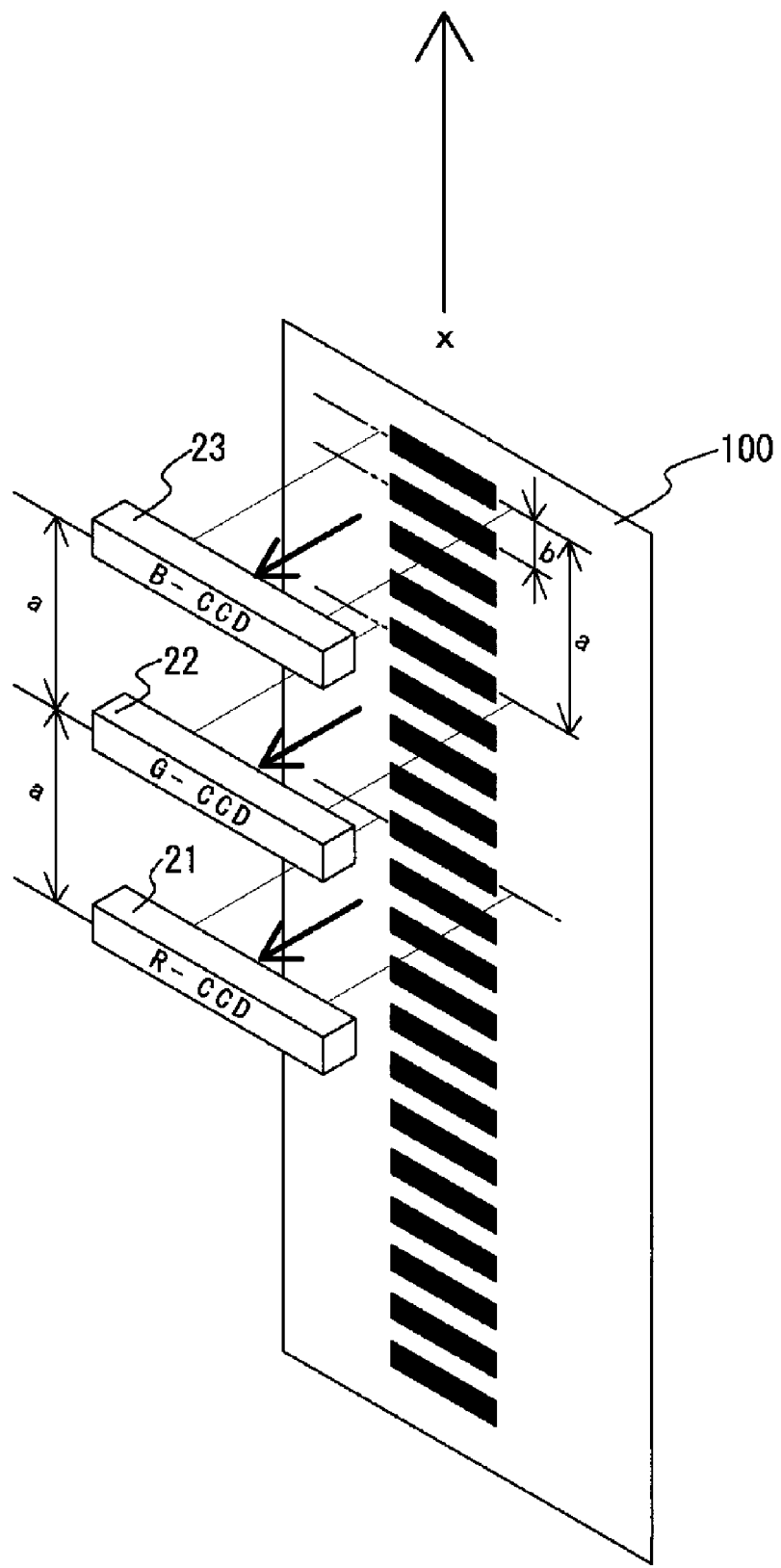
FIG. 1 illustrates an operation performed when three color line sensors scan an original document at equal intervals in a sub-scanning direction.

A generation state of the false color will be described in detail. As illustrated in FIG. 1, an image processing apparatus preferably includes an R line sensor 21 arranged to scan an R component, a G line sensor 22 arranged to scan a G component, and a B line sensor 23 arranged to scan a B component. The sensors 21, 22, 23 are arranged substantially parallel to a main scanning direction and at predetermined intervals (each interval corresponds to a range of "a" in FIG. 1) in a sub-scanning direction. Each of the line sensors 21, 22, 23 linearly scans a different position of an original document 100 simultaneously.

In FIG. 1, illustrating a state of scanning by the line sensors, a linear rectangular black portion that is drawn on the original document 100 and extends in the main scanning direction indicates the image scanning position, and in order to simplify the description, each of these black portions has a prescribed length in the sub-scanning direction.

As illustrated in FIG. 1, each interval of the scanning positions (i.e., a distance "b" between centers of the length in the sub-scanning direction of the black portions) is one fourth of a distance between the line sensors (i.e., a distance "a" between centers of the length in the sub-scanning direction of the line sensors), and indicates the length of time when the original document is scanned at about 100 percent magnification. In FIG. 1, the distance between the line sensors indicates that there are four offset lines.

In the image processing apparatus of FIG. 1, a scanning period in the sub-scanning direction of the line sensors with respect to the original document 100 is constant, and at about 100 percent magnification, the scanning speed is controlled such that the image is scanned by moving the scanning position by the distance "b".

Because the scanning period of the line sensors 21, 22, 23 is constant, the magnification at which the original document 100 is scanned is determined by changing the relative scanning speed of the scanning positions of the line sensors 21, 22, 23 with respect to the original document 100, i.e., by changing a feed amount of the original document with respect to the line sensors per unit time.

Further, although it is not illustrated, the scanned data acquired by each line sensor is sequentially accumulated in a memory, and an amount of delay is acquired to handle, as one piece of relative data, each scanned data of the same scanned position or approximately the same scanned position scanned by each line sensor based on the scanning speed, which is the feed amount. The scanned data scanned by each line sensor is read from the memory, the scanned data of the R component, the scanned data of the G component, and the scanned data of the B component are combined to generate the pixel data, and a plurality of pieces of pixel data are combined to generate image data of the original document based on the amount of delay.

The original document 100 is relatively moved with respect to each line sensor 21, 22, 23 in a direction indicated by "x" in FIG. 1 (i.e., in the sub-scanning direction), and the image is scanned. Hereinafter, an upstream side refers to a rear side (i.e., a side of the R line sensor 21) of the moving direction of the original document 100 with respect to the line sensors 21, 22, 23, and a downstream side refers to a front side (a side of the B line sensor 23) of the moving direction.

Next, the generation state of the false color will be described based on the drawing illustrating the image scanning state of each line sensor and the drawing illustrating a color-overlapped state of the RGB scanned data. A case of 100 percent magnification in which the false color is not generated will be described first.

Figure 2:
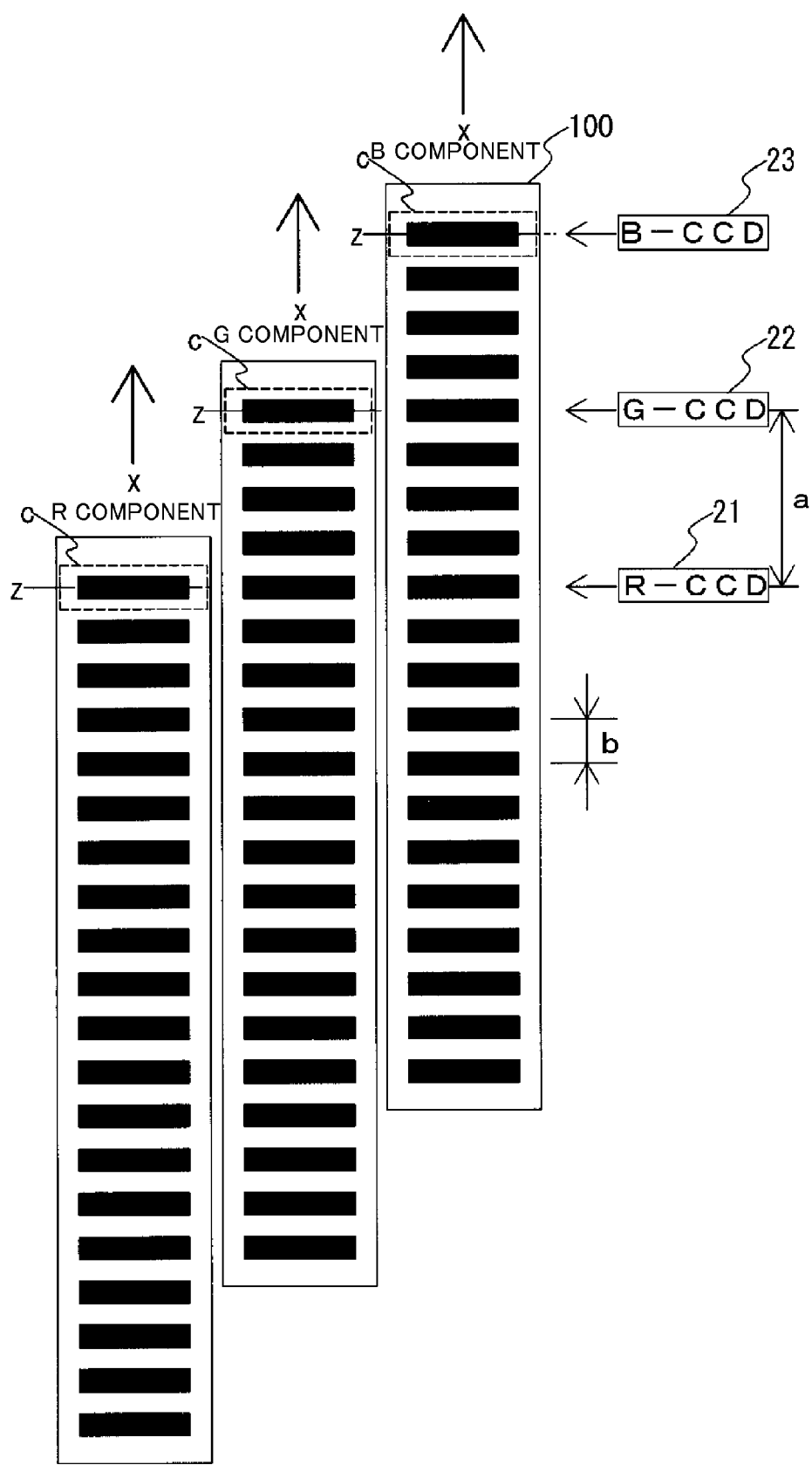
FIG. 2 illustrates image scanning positions of respective color components at the time when the three color line sensors scan the original document at 100 percent magnification.

FIG. 2 illustrates the scanning position with respect to each color component scanned by each line sensor 21, 22, 23 at 100 percent magnification. In FIG. 2, with respect to the original document 100, a scanning state in which the R component is scanned by the R line sensor 21 is illustrated on the left side, a scanning state in which the document 100 is moved by the distance "a" (i.e., the distance of four lines) in the sub-scanning direction with respect to the R line sensor 21 and in which the G component is scanned by the G line sensor 22 is illustrated in the center, and a scanning state in which the document 100 is further moved by the distance "a" in the sub-scanning direction with respect to the G line sensor 22 and in which the B component is scanned by the B line sensor 23 is illustrated on the right. In FIG. 2, the position of each line sensor 21, 22, 23 is fixed.

As illustrated in FIG. 2, at the first scanning position of the original document 100 (i.e., a portion surrounded by a dashed-line square "c" of FIG. 2), the scan data of the R component is scanned by the R line sensor 21 first, then the document is moved by the distance "a" in the sub-scanning direction, the scan data of the G component is scanned by the G line sensor 22, the document is further moved by the distance "a" in the sub-scanning direction, and the scan data of the B component is scanned by the B line sensor 23. The scan data of the B component scanned by the B line sensor 23 is scanned after the document is moved by eight lines, which is twice the distance "a", from the time of scanning the scan data of the R component.

A line "z" passing through the center of the length in the sub-scanning direction of the portion surrounded by the dashed-line square "c" in FIG. 2 corresponds to a center line of each line sensor. The same applies to FIGS. 4, 7, 10, and 13 in which other magnifications are described.

Further, since the scanning position by each line sensor 21, 22, 23 is different from each other, the scanned data scanned by each line sensor 21, 22, 23 is accumulated in the scanned data accumulation memory. The amounts of delay of the G line sensor 22 and the B line sensor 23 with respect to the R line sensor 21 are acquired, and the scanned data of each color of the same scanning position is read out from the memory to be combined into the scanned data.

Figure 3:
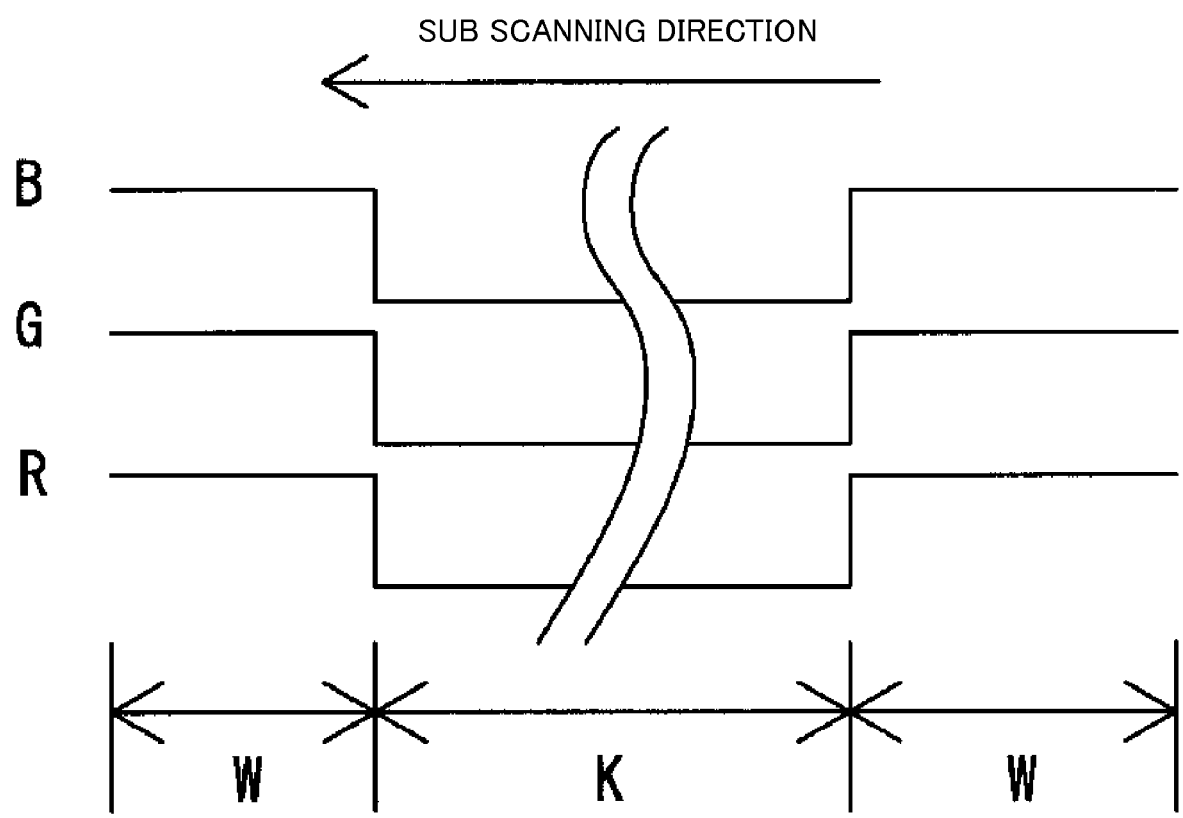
FIG. 3 illustrates an overlapped state of scanned data of each color component combined on the same line of the original document in the case of FIG. 2.

FIG. 3 illustrates a state in which the scanned data of the scanning position that is surrounded by the dashed-line square "c" in FIG. 2 and scanned by each line sensor 21, 22, 23 is combined. At 100 percent magnification, since no displacement is generated at the scanning position of each line sensor 21, 22, 23, the boundary portion where the scanned data of each color component changes from black to white indicates the same position, the three colors are completely overlapped, and the pixel data is generated. The overlapped portion indicates black (K), and the outside thereof indicates white (W), thereby generating no false color.

However, as described above, by arranging each interval of the line sensors to be four lines, when the original document 100 is scanned at between 101 percent magnification and 124 percent magnification, displacement is generated at the scanning position of each line sensor 21, 22, 23, and a false color is generated at the boundary portion where the combined pixel data changes from black to white.

Figure 4:
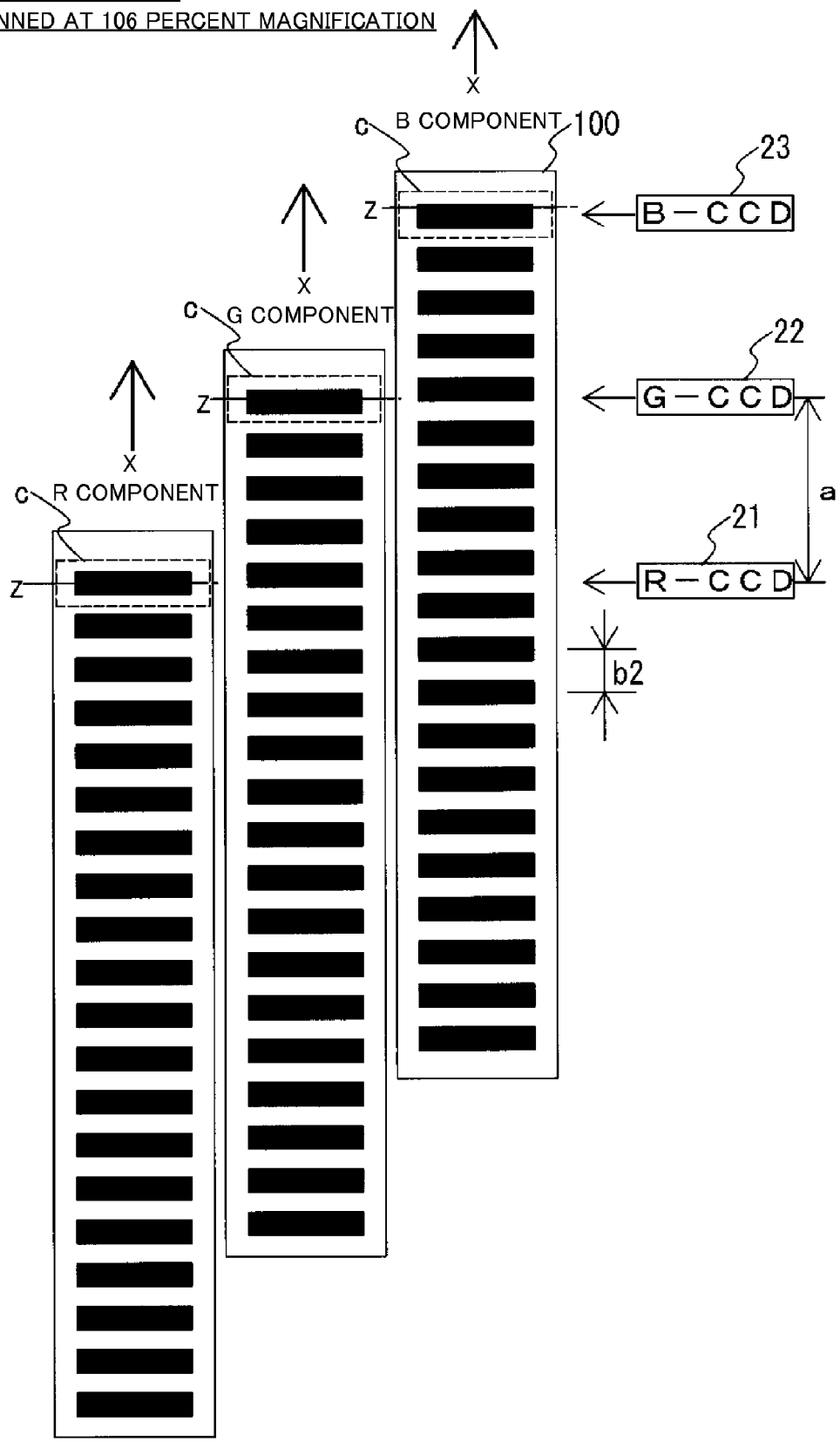
FIG. 4 illustrates scanning positions of respective color components at the time when the three color line sensors scan the original document at 106 percent magnification.

For example, when scanning at 106 percent magnification, as illustrated in FIG. 4, the length of an interval "b2" of the scanning positions becomes one fourth of the distance "a" between the line sensors, that is, the length of the interval "b2" becomes less than the interval "b" of the scanning positions at the time of about 100 percent magnification illustrated in FIG. 2.

Figure 5:
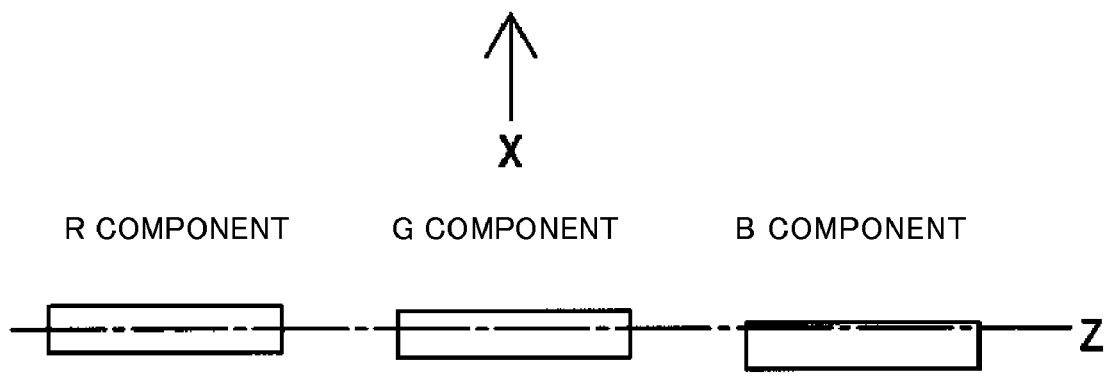
FIG. 5 illustrates a positional relationship of the scanning position of each color component on substantially the same line of the original document in the case of FIG. 4.

FIG. 5 illustrates how the scanning position of each color component in the dashed-line square "c" of FIG. 4 is arranged with respect to the center line "z" of the line sensor.

As illustrated in FIG. 5, the scanning position of each color component does not match. When the scanning position of the R component matches the center line "z" of the line sensors, based on the center line "z", the scanning position of the G component is positioned on an upstream side of the scanning position of the R component, and the scanning position of the B component is positioned on a further upstream side of the scanning position of the G component.

Figure 6:
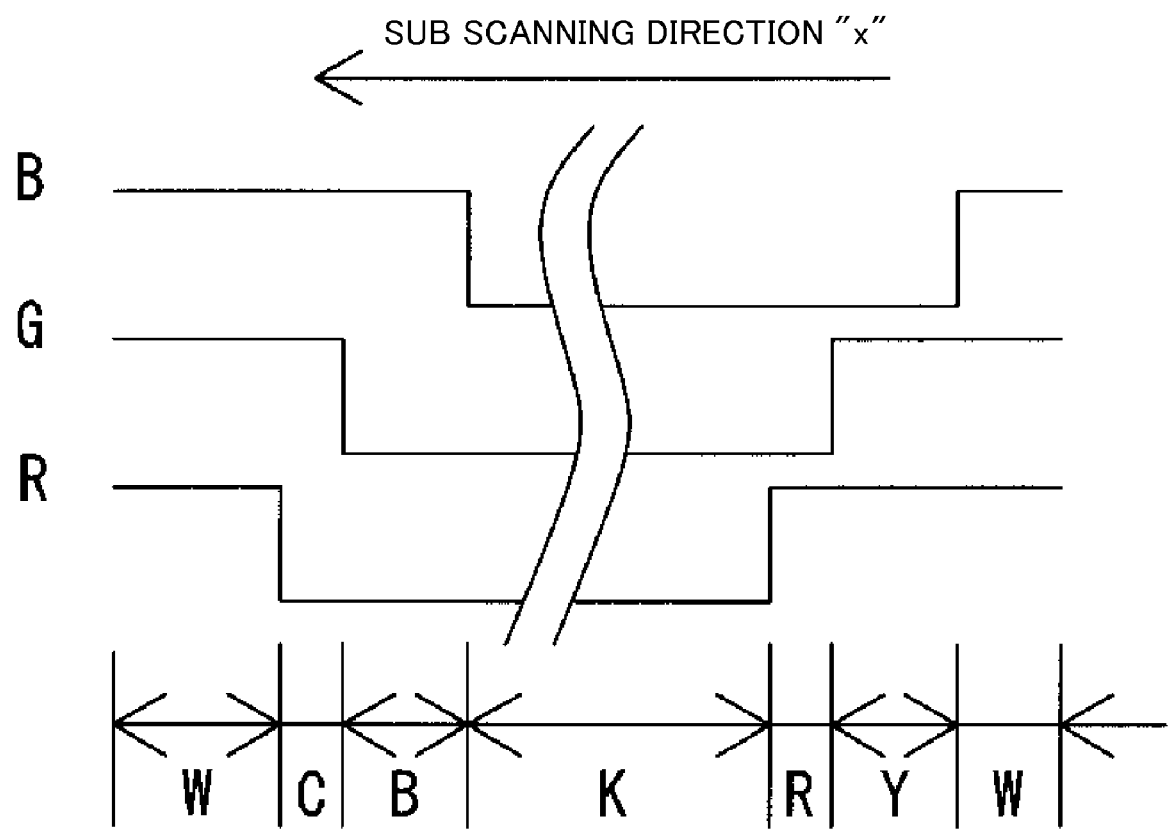
FIG. 6 illustrates an overlapped state of the scanned data of each color component on substantially the same line of the original document in the case of FIG. 4.

Accordingly, when the image is scanned at 106 percent magnification, and when each scanned data of the three colors is combined to generate the pixel data, displacement is generated in the overlap of the three colors as illustrated in FIG. 6. In other words, outside of the black (K) portion where the three colors overlap, red (R) is generated on an upstream side, blue (B) is generated on a downstream side, and outside of these false colors, yellow (Y) is generated on an upstream side, and cyan (C) is generated on a downstream side. With respect to the pixel data, each color component signal of RGB is converted into signals that represent first color-difference data and second color-difference data. When saturation distribution is acquired based on the first and second color-difference data, in the pixel data, a mixed color of red (R) and yellow (Y) is generated on the upstream side in the sub-scanning direction of the scanning position, and a mixed color of blue (B) and cyan (C) is generated on the downstream side, due to the generation of the false colors.

The saturation distribution state that occurs at 106 percent magnification similarly occurs at between 101 percent magnification and 106 percent magnification. Furthermore, as the magnification increases, red (R) and yellow (Y) increase in the mixed color of red (R) and yellow (Y), and blue (B) and cyan (C) increase in the mixed color of blue (B) and cyan (C).

Figure 7:
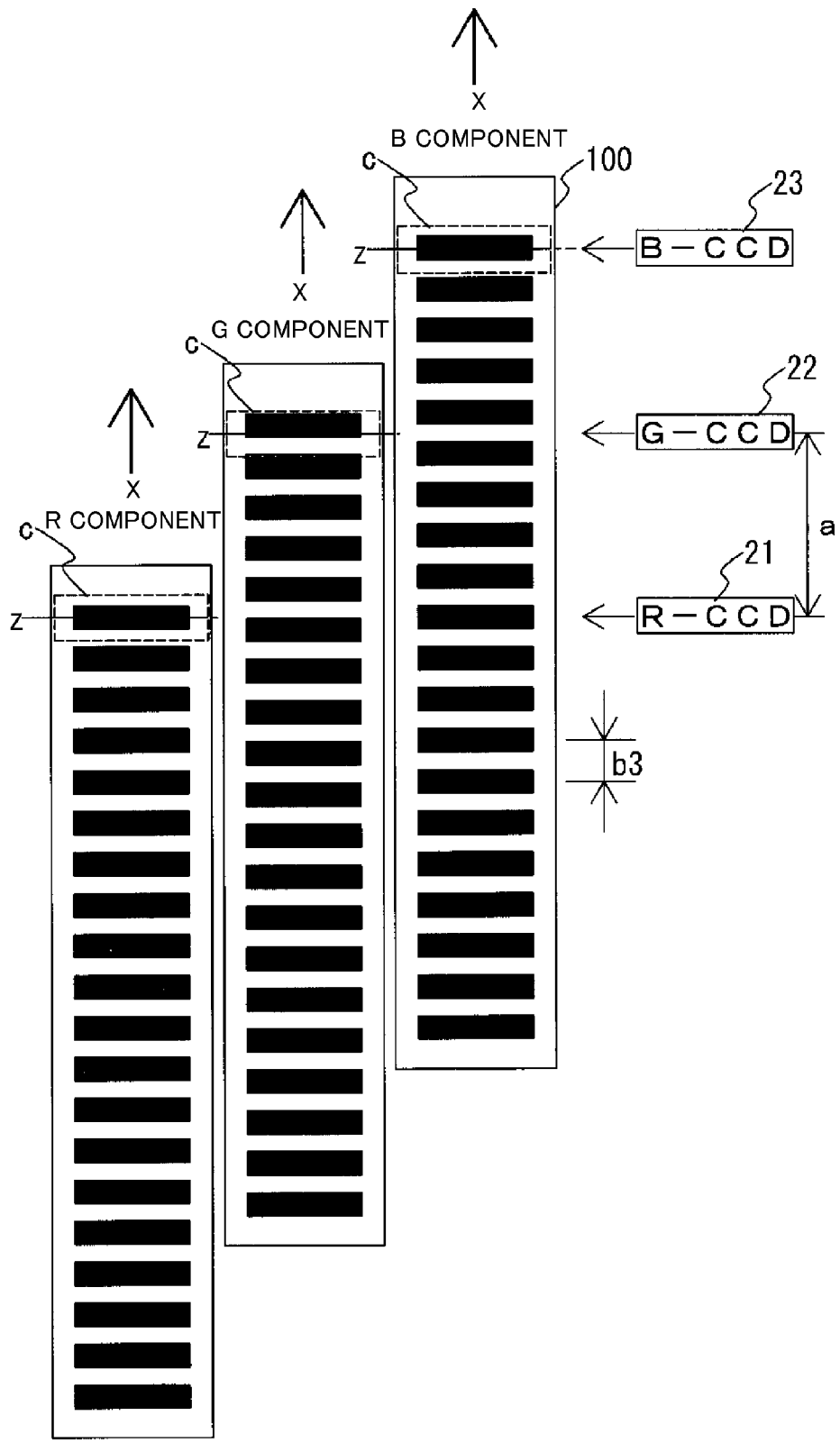
FIG. 7 illustrates image scanning positions of respective color components at the time when the three color line sensors scan the original document at 112 percent magnification.

When scanning at 112 percent magnification, for example, as illustrated in FIG. 7, the length of an interval "b3" of the scanning positions is less than the interval "b" of the scanning positions at the time of 100 percent magnification illustrated in FIG. 2.

Figure 8:
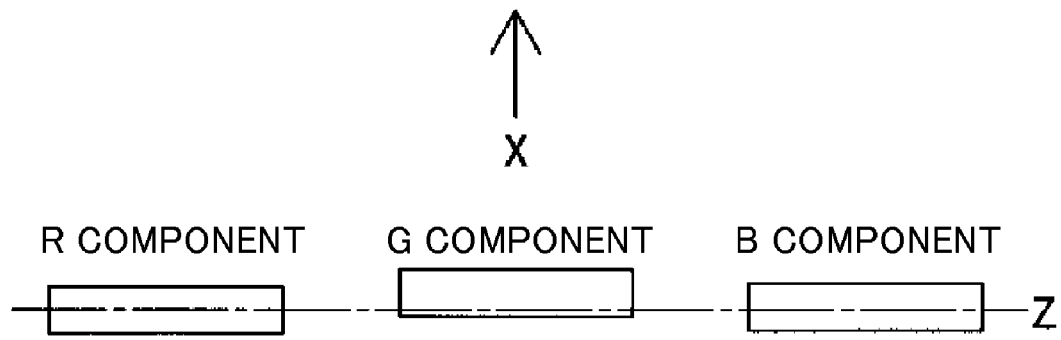
FIG. 8 illustrates a positional relationship of the scanning position of each color component on substantially the same line of the original document in the case of FIG. 7.

FIG. 8 illustrates how the scanning position of each color component in the dashed-line square "c" of FIG. 7 is arranged with respect to the center line "z" of the line sensor similarly to the case of FIG. 4. As illustrated in FIG. 8, the scanning position of each color component does not match. Based on the center line "z" of the line sensor, which matches the scanning position of the R component, the scanning position of the G component is positioned on a downstream side of the scanning position of the R component, and the scanning position of the B component is positioned on an upstream side of the scanning position of the R component.

Figure 9:
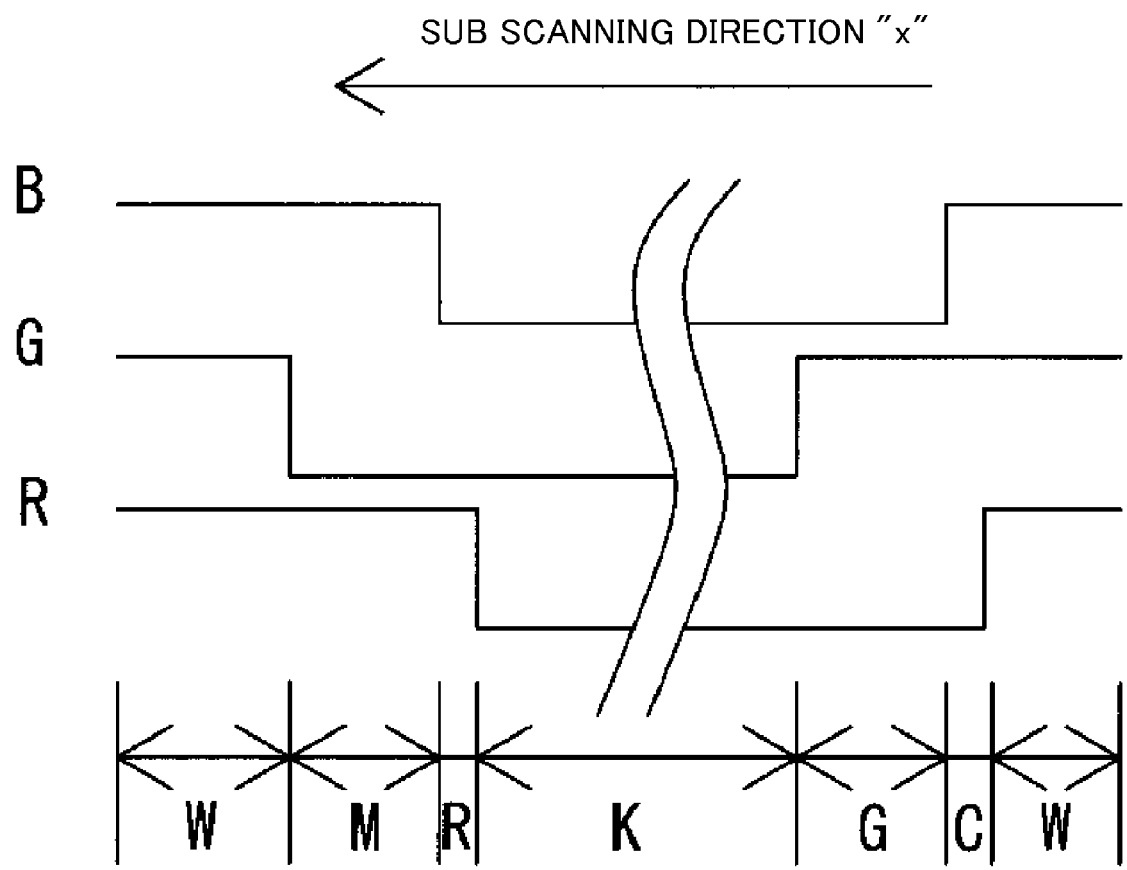
FIG. 9 illustrates an overlapped state of the scanned data of each color component on substantially the same line of the original document in the case of FIG. 7.

Accordingly, when the image is scanned at 112 percent magnification, and when each scanned data of three colors is combined to generate the pixel data, as illustrated in FIG. 9, displacement is generated in the overlap of the three colors. In this case, outside of the black (K) portion where the three colors overlap, green (G) is generated on an upstream side, red (R) is generated on a downstream side, and outside of these false colors, cyan (C) is generated on an upstream side, and magenta (M) is generated on a downstream side. When the saturation distribution based on the first and second color-difference data is acquired similarly to the above with respect to the pixel data, in the pixel data, a mixed color of green (G) and cyan (C) is generated on the upstream side in the sub-scanning direction of the scanning position, and a mixed color of red (R) and magenta (M) is generated on the downstream side due to the generation of the false colors.

The saturation distribution state occurring at 112 percent magnification similarly occurs at between 107 percent magnification and 112 percent magnification. Further, as the magnification increases, red (R) decreases and magenta (M) increases in the mixed color of red (R) and magenta (M), and green (G) increases and cyan (C) decreases in the mixed color of green (G) and cyan (C).

Figure 10:
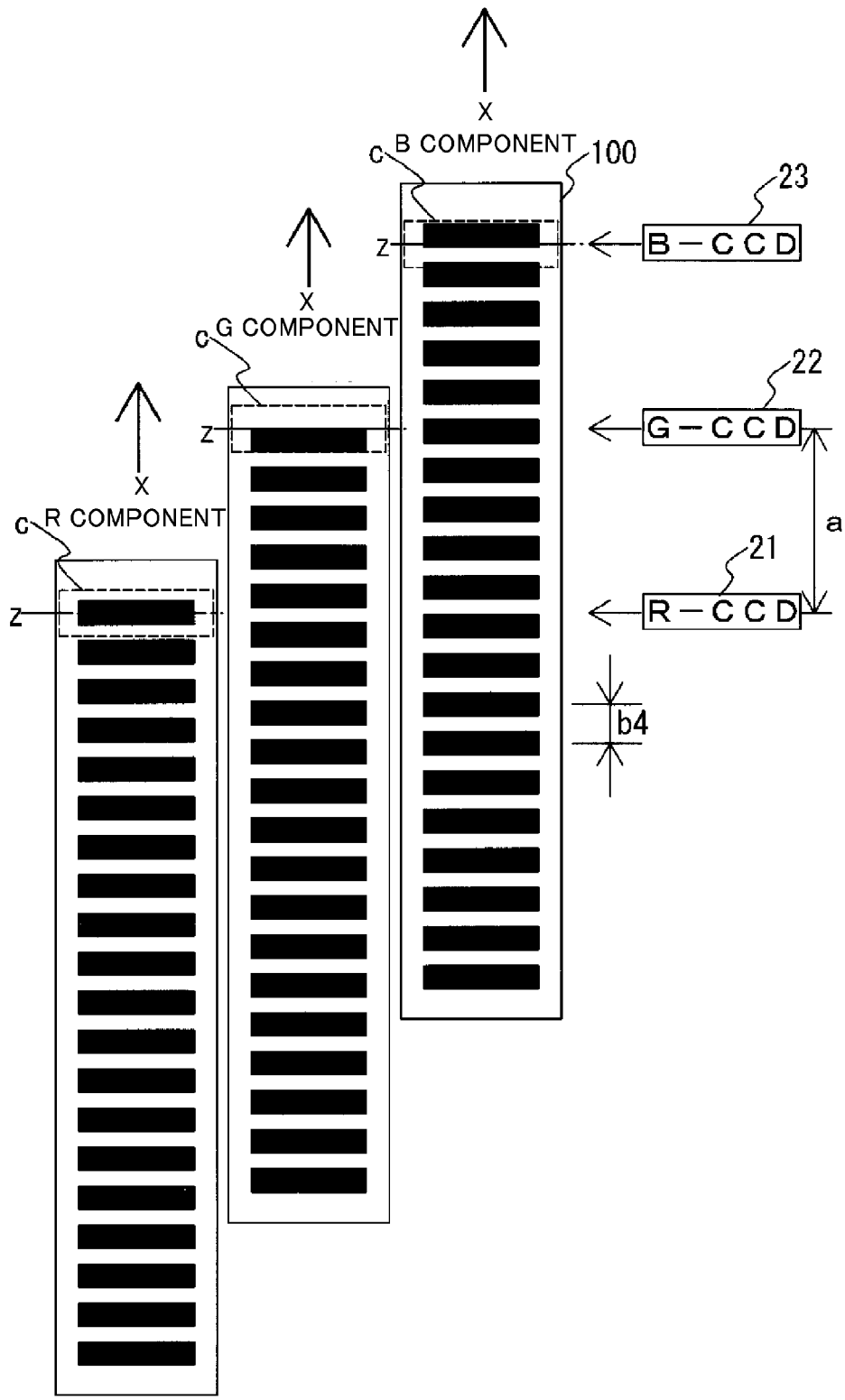
FIG. 10 illustrates image scanning positions of respective color components at the time when the three color line sensors scan the original document at 118 percent magnification.

Further, when scanning at 118 percent magnification, for example, as illustrated in FIG. 10, the length of an interval "b4" of the scanning positions is less than the interval "b" of the scanning positions of the time of 100 percent magnification illustrated in FIG. 2.

Figure 11:
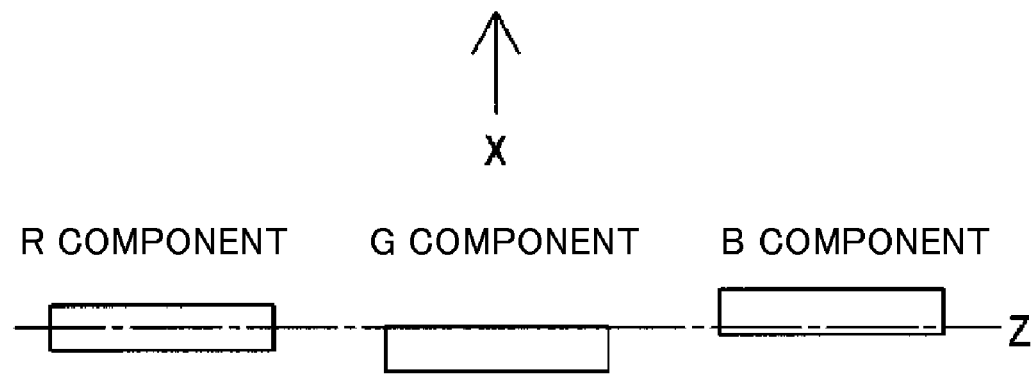
FIG. 11 illustrates a positional relation of the scanning position of each color component on substantially the same line of the original document in the case of FIG. 10.

FIG. 11 illustrates how the scanning position of each color component in the dashed-line square "c" of FIG. 10 is arranged with respect to the center line "z" of the line sensor similarly to the case of FIG. 4. As illustrated in FIG. 11, the scanning position of each color component does not match. Based on the center line "z" of the line sensor, which matches the scanning position of the R component, the scanning position of the G component is positioned on an upstream side of the scanning position of the R component, and the scanning position of the B component is positioned on a downstream side of the scanning position of the R component.

Figure 12:
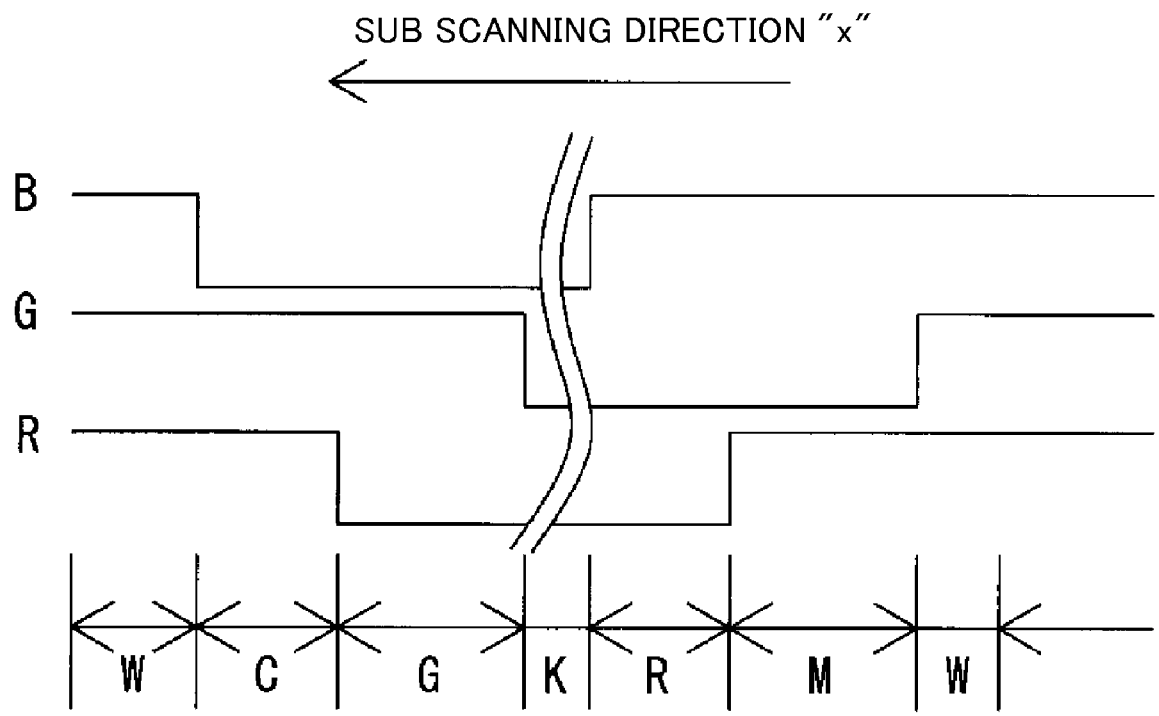
FIG. 12 illustrates an overlapped state of the scanned data of each color component on substantially the same line of the original document in the case of FIG. 10.

Accordingly, when the image is scanned at 118 percent magnification, and when each scanned data of the three colors is combined to generate the pixel data, as illustrated in FIG. 12, displacement is generated in the overlap of the three colors. In this case, outside of the black (K) portion where the three colors overlap, red (R) is generated on an upstream side, green (G) is generated on a downstream side, and outside of these false colors, magenta (M) is generated on an upstream side, and cyan (C) is generated on a downstream side. When the saturation distribution based on the first and second color difference data is acquired similarly to the above with respect to the pixel data, in the pixel data, a mixed color of red (R) and magenta (M) is generated on the upstream side in the sub-scanning direction of the scanning position, and a mixed color of green (G) and cyan (C) is generated on the downstream side, due to the generation of the false colors.

The saturation distribution state occurred at about 118 percent magnification similarly occurs at between about 113 percent magnification and about 118 percent magnification. Further, as the magnification increases, red (R) increases and magenta (M) decreases in the mixed color of (R) and magenta (M), and green (G) decreases and cyan (C) increases in the mixed color of green (G) and cyan (C). The generation position of each false color is opposite, with respect to a line width direction, at between 113 percent magnification and 118 percent magnification from that of each false color generated at between 107 percent magnification and 112 percent magnification. A mixed color of red (R) and magenta (M) is generated on an upstream side, and a mixed color of green (G) and cyan (C) is generated on a downstream side.

Figure 13:
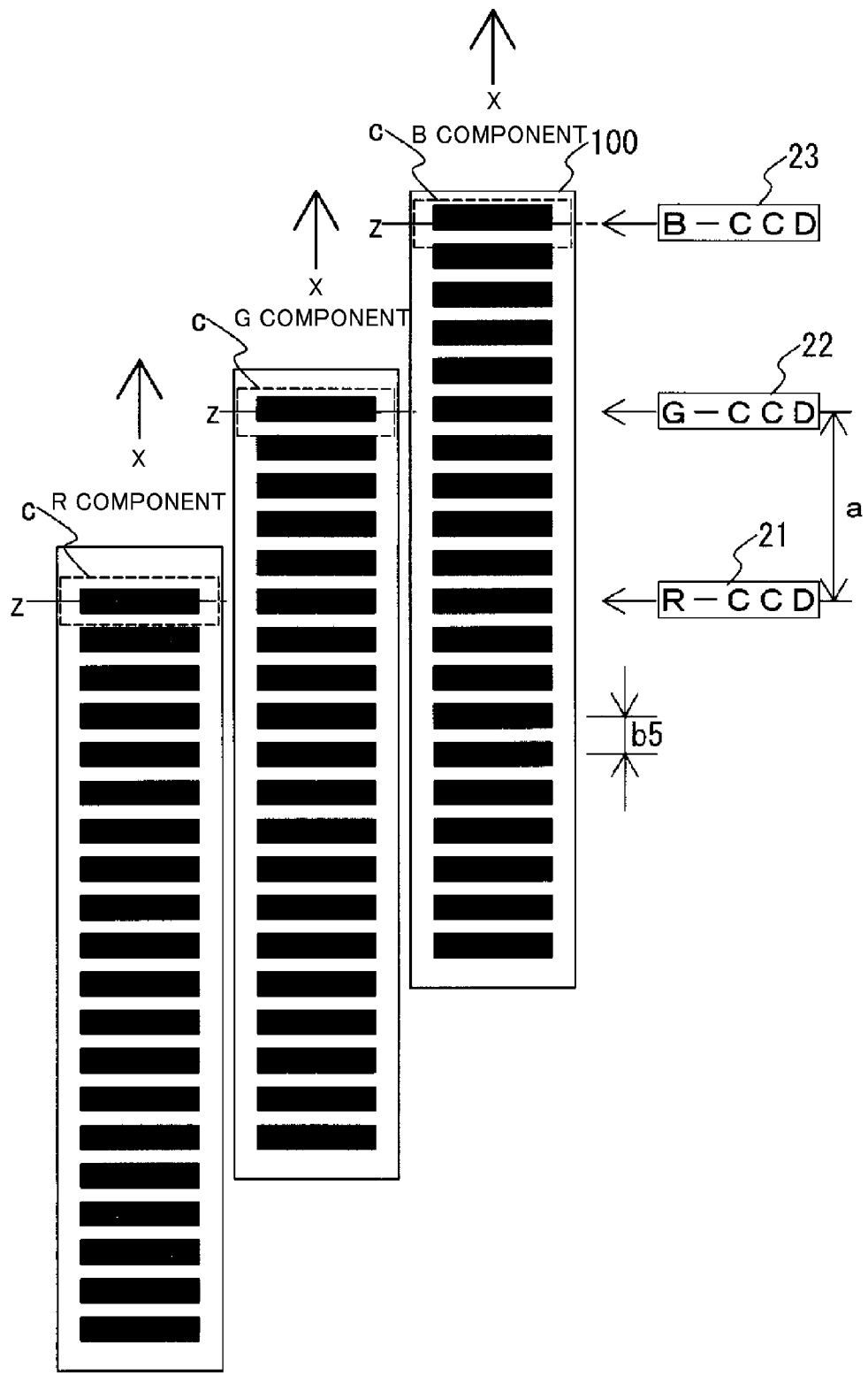
FIG. 13 illustrates image scanning positions of respective color components at the time when the three color line sensors scan the original document at 123 percent magnification.

Further, when scanning at 123 percent magnification, as illustrated in FIG. 13, the length of an interval "b5" of the scanning positions is less than the interval "b" of the scanning positions at the time of 100 percent magnification illustrated in FIG. 2.

Figure 14:
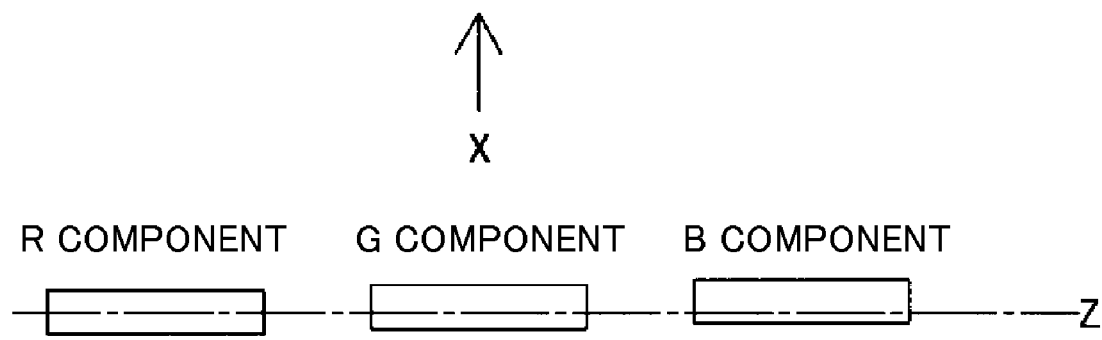
FIG. 14 illustrates a positional relation of the scanning position of each color component on substantially the same line of the original document in the case of FIG. 13.

FIG. 14 illustrates how the scanning position of each color component in the dashed-line square "c" of FIG. 13 is arranged with respect to the center line "z" of the line sensor similarly to the case of FIG. 4. As illustrated in FIG. 14, the scanning position of each color component does not match. Based on the center line "z" of the line sensor, which matches the scanning position of the R component, the scanning position of the G component is positioned on a downstream side of the scanning position of the R component, and the scanning position of the B component is positioned on a further downstream side of the scanning position of the G component.

Figure 15:
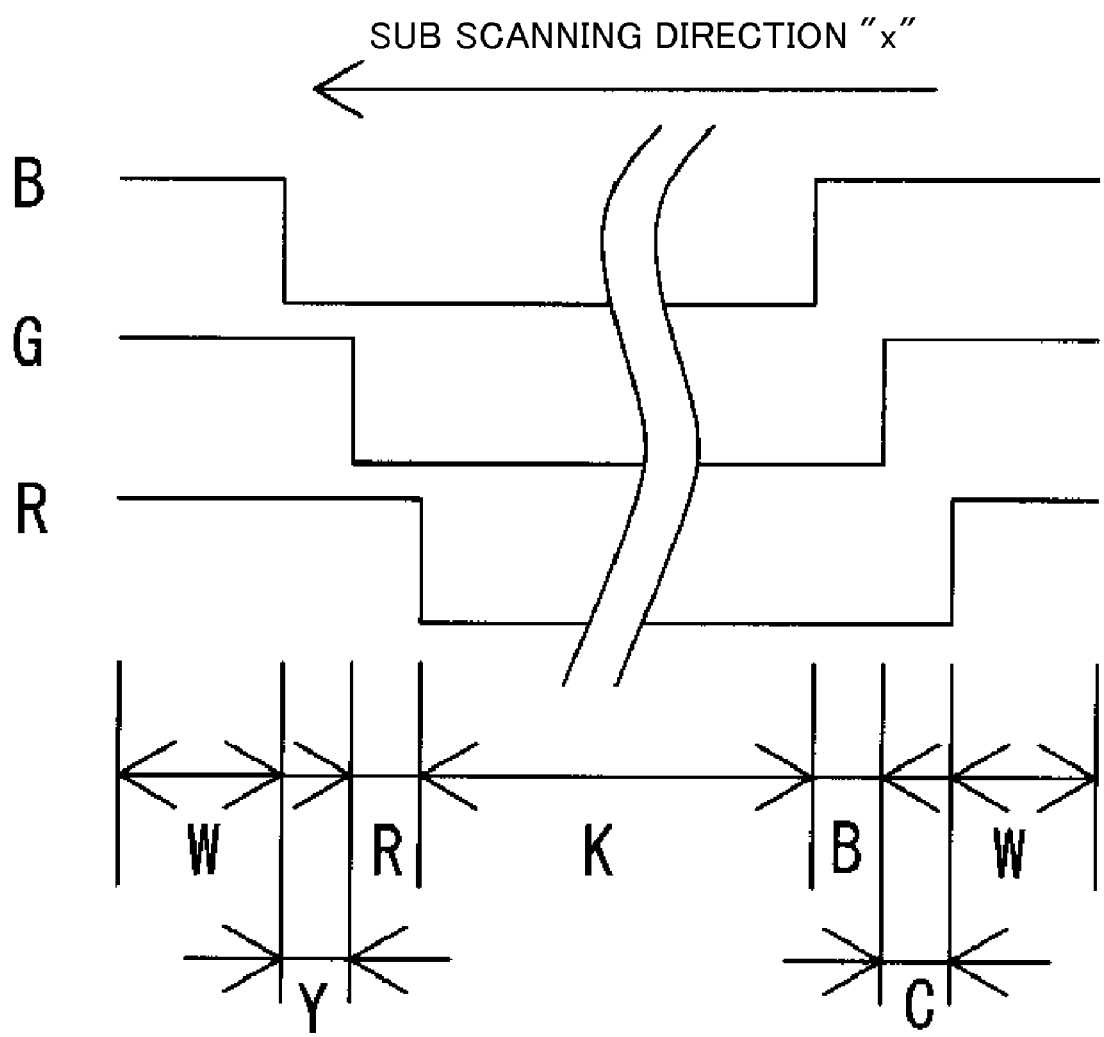
FIG. 15 illustrates an overlapped state of the scanned data of each color component on substantially the same line of the original document in the case of FIG. 13.

Accordingly, when the image is scanned at 123 percent magnification, and when each scanned data of the three colors is combined to generate the pixel data, as illustrated in FIG. 15, displacement is generated in the overlap of the three colors. In this case, outside of the black (K) portion where the three colors overlap, blue (B) is generated on an upstream side, red (R) is generated on a downstream side, and outside of these false colors, cyan (C) is generated on an upstream side, and yellow (Y) is generated on a downstream side. When the saturation distribution based on the first and second color difference data is acquired similarly to the above with respect to the pixel data, in the pixel data, a mixed color of blue (B) and cyan (C) is generated on the upstream side in the sub-scanning direction of the scanning position, and a mixed color of red (R) and yellow (Y) is generated on the downstream side due to the generation of the false colors.

The saturation distribution state occurring at 123 percent magnification similarly occurs at between 119 percent magnification and 124 percent magnification. Further, as the magnification increases, red (R) and yellow (Y) decrease in the mixed color of (R) and yellow (Y), and blue (B) and cyan (C) decrease in the mixed color of blue (B) and cyan (C).

The above-described generation of false colors similarly occurs at between 126 percent magnification and 149 percent magnification, and in accordance with the change of the magnification, the state of false colors regularly changes. The generation state of the above-described false colors changes depending on the number of offset lines of the line sensors, however, in any state, the false colors regularly change in accordance with the change of the magnification.

Next, with reference to the drawings, an image processing apparatus arranged to determine an achromatic color by using the generation state of the false colors that regularly changes in accordance with the change of the magnification will be described according to preferred embodiments of the present invention.

Figure 16:
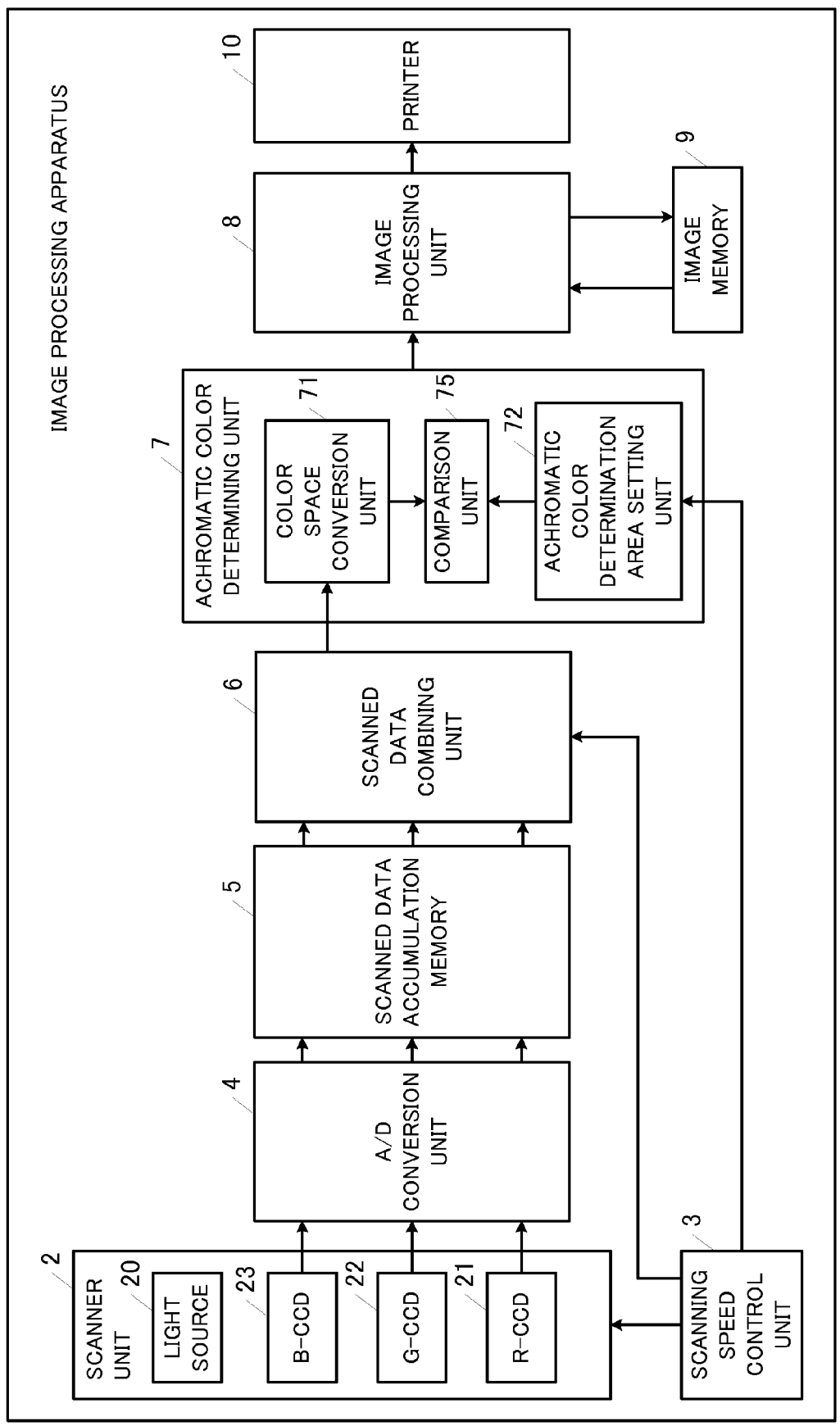
FIG. 16 is a block diagram illustrating an example of an image processing apparatus according to a preferred embodiment of the present invention.

FIG. 16 is a block diagram illustrating an example of an image processing apparatus 1 according to a preferred embodiment of the present invention. The image processing apparatus 1 generates image data by using three line sensors that scan the R component, the G component, and the B component.

The image processing apparatus 1 according to a preferred embodiment includes, for example, a scanner unit 2, a scanning speed control unit 3, an Analog/Digital (A/D) conversion unit 4, a scanned data accumulation memory 5, a scanned data combining unit 6, an achromatic color determining unit 7, an image processing unit 8, an image memory 9, and a printer 10.

The scanner unit 2 includes a light source 20 that irradiates light onto the original document, and an R line sensor 21, G line sensor 22, and B line sensor 23 that receive reflected light from the original document. Each line sensor 21, 22, 23 includes a Charge Coupled Device (CCD) image sensor, for example, that includes three linear photoelectric conversion elements that correspond to the respective colors of red, green, and blue. The R component of the original document image is scanned by the R line sensor 21, the G component of the original document image is scanned by the G line sensor 22, and the B component of the original document image is scanned by the B line sensor 23. Thus, by receiving the reflected light from the original document, each line sensor 21, 22, 23 scans the original document image line by line as the color scanned data of each primary color of RGB.

Each of the line sensors 21, 22, 23 includes a plurality of light receiving elements (photoelectric conversion elements) aligned in line, and is arranged at equal intervals such that the line direction indicates the main scanning direction. The interval of each line sensor 21, 22, 23 is set to be an integral multiple of a moving amount in the sub-scanning direction of the scanning position of the case in which the image is scanned at 100 percent magnification. In a preferred embodiment of the present invention, each line sensor 21, 22, 23 is arranged at intervals of four lines (i.e., the number of offset lines are four). The R line sensor 21, the G line sensor 22, and the B line sensor 23 are sequentially arranged from the upstream side of the sub-scanning direction.

An analog signal received by the receiving elements of each line sensor 21, 22, 23 is transmitted from the scanner unit 2 to the A/D conversion unit 4 to be converted into digital data. In the scanning of the original document by each line sensor 21, 22, 23, the signal is output from each light receiving element of each line sensor 21, 22, 23 in accordance with a prescribed order, the image scanning of main scanning is performed, and when the original document is relatively moved in a direction that is substantially perpendicular to the main scanning direction, the image scanning of sub-scanning is performed.

The sub-scanning of the original document may be performed by moving the light source 20 and each line sensor 21, 22, 23 with respect to a still sheet of paper, or may be performed by moving the sheet of paper while the light source 20 and each line sensor 21, 22, 23 remain still, for example.

For example, when using a Flat Bed Scanner (FBS) unit in which the scanner unit 2 irradiates light from the light source through a transparent plate to the original document placed on the transparent plate, and each line sensor 21, 22, 23 receives the reflected light, the sub-scanning can be performed by moving the light source 20 and each line sensor 21, 22, 23 towards the sheet of paper remaining still on the transparent plate. On the other hand, when using an Automatic Document Feeder (ADF) unit in which the scanner unit 2 separates the original documents one sheet at a time and automatically feeds the separated document, the sub-scanning can be performed by sending the original document from the ADF unit to the still light source 20 and each line sensor 21, 22, 23.

Further, the image processing apparatus 1 according to the present preferred embodiment can enlarge and reduce the original document by changing the scanning magnification by one percent from 100 percent magnification. In the present preferred embodiment, by changing the relative scanning speed in the sub-scanning direction of the original document and each line sensor 21, 22, 23 in accordance with the magnification percentage and reduction percentage, image scanning of the enlargement and reduction can be performed. The above-described scanning speed is controlled by the scanning speed control unit 3. It is set such that, even when the scanning magnification is changed, a scanning period of the original document by each line sensor 21, 22, 23 does not change.

The data of the color component signal of each line sensor 21, 22, 23, converted by the A/D conversion unit 4, is accumulated as the scanned data with respect to each color component in the scanned data accumulation memory 5. The scanned data accumulated in accordance with a prescribed scanning period of each line sensor 21, 22, 23, along with an accumulation time is written in the scanned data accumulation memory 5.

The scanned data combining unit 6 combines each scanned data which is scanned at approximately the same image scanning position of the original document from the scanned data output from each line sensor 21, 22, 23. In other words, the scanned data combining unit 6 reads out the scanned data of each color component scanned at the same or approximately the same scanning position of the original document, combines the scanned data of the three colors, and generates the pixel data, from the scanned data accumulated in the scanned data accumulation memory 5.

Furthermore, the scanned data combining unit 6 acquires, based on the magnification, the number of offset lines from the standard R line sensor 21 to the G line sensor 22 and the B line sensor 23 so as to determine the scanned data to be combined in order to read out the scanned data of each color component scanned at the same or approximately the same scanning position of the original document.

The achromatic color determining unit 7 determines whether the pixel data generated by the scanned data combining unit 6 is achromatic or chromatic. The achromatic color determining unit 7 includes a color space conversion unit 71 arranged to convert each color component signal that is based on RGB signals of the pixel data combined by the scanned data combining unit 6 into a signal representing first color-difference data (Cr) and a signal representing second color-difference data (Cb); an achromatic color determination area setting unit 72; and a comparison unit 75 arranged to compare, with an achromatic color determination area, the pixel data that is in a color space defined by orthogonal coordinates having the first and second color-difference data as coordinate axes.

The achromatic color determination area setting unit 72 sets the achromatic color determination area in the orthogonal coordinates having each color-difference data (Cr, Cb) as the coordinate axes, i.e., in the color space coordinates representing saturation distribution acquired based on the signals representing each color difference data (Cr, Cb) converted by the color space conversion unit 71. The achromatic color determination area includes a first achromatic color determination area 73 having the combined pixel data as a standard when the image scanning position of each line sensor 21, 22, 23 matches, and an elongated second achromatic color determination area 74, which is the achromatic color determination area of the time when the image scanning position of each line sensor 21, 22, 23 is displaced.

Figure 17A:
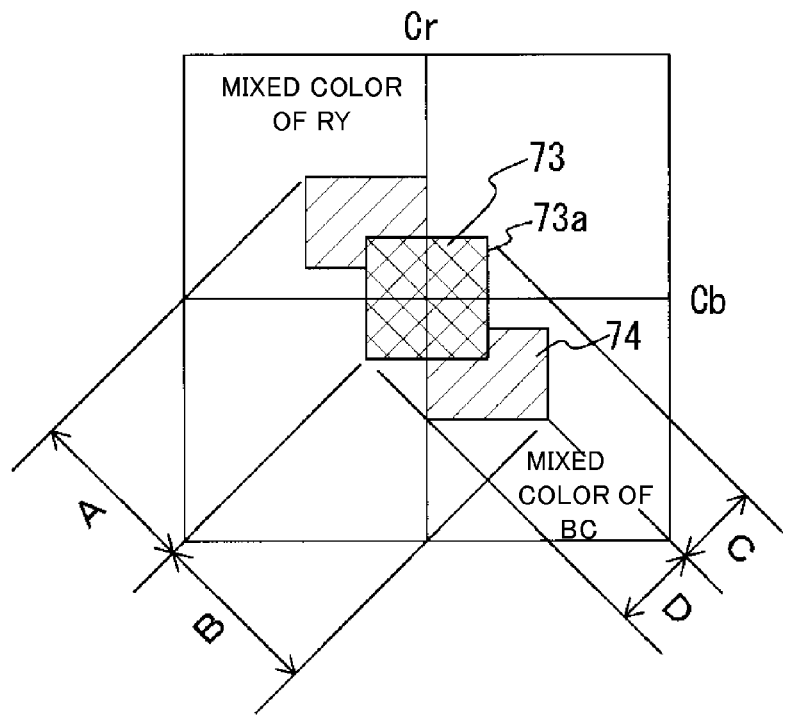
FIGS. 17A and 17B illustrate color space coordinates representing an achromatic color determination area.
Figure 17B:
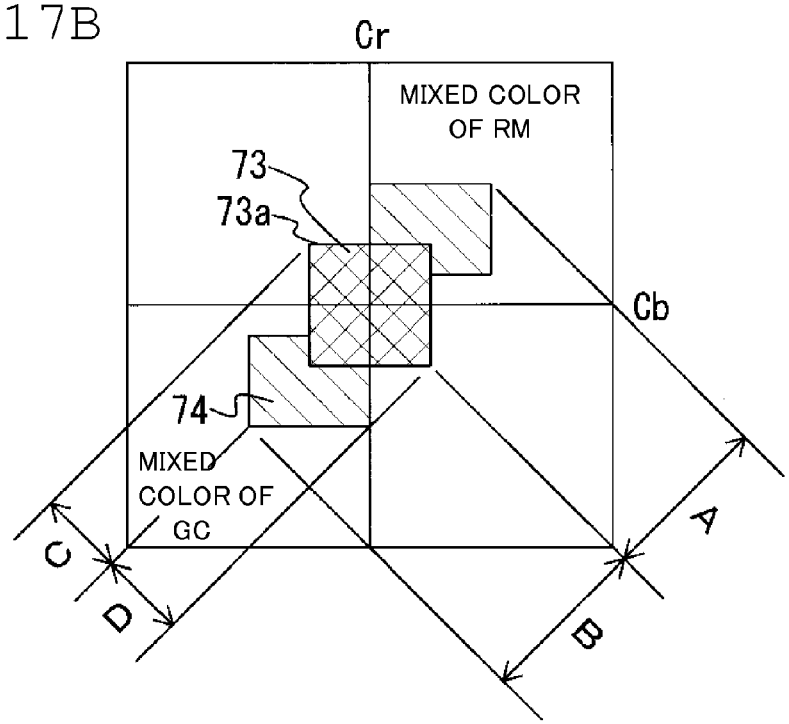

As illustrated in FIGS. 17A and 17B, the first achromatic color determination area 73 is inside of a square frame 73a of which center is the origin of the coordinates. The second achromatic color determination area 74 is inside of an elongated area that includes the coordinate origin of the color space coordinates and that is set such that each longitudinal direction extends from the coordinate origin in an opposite direction. In FIGS. 17A and 17B, the cross-hatched area indicates the first achromatic color determination area 73, and the area that includes the first achromatic color determination area 73 and extends obliquely indicates the second achromatic color determination area 74. The second achromatic color determination area 74 is arranged such that an edge portion in the longitudinal direction thereof protrudes from the first achromatic color determination area 73.

As illustrated in FIGS. 17A and 17B, the second achromatic color determination area 74 is arranged such that the longitudinal direction is changed at the prescribed magnification. In the present preferred embodiment of the present invention, in a case in which the interval of each line sensor 21, 22, 23 is set to be four lines, when the range of magnification is from 100 percent to 150 percent, the scanning position of the line sensors is displaced in the range from 101 percent to 124 percent and in the range from 126 percent to 149 percent.

Accordingly, in the present preferred embodiment, the second achromatic color determination area 74 illustrated in FIG. 17A is set at the magnifications ranging from 101 percent to 106 percent, from 119 percent to 124 percent, from 126 percent to 131 percent, and from 144 percent to 149 percent, and the second achromatic color determination area 74 illustrated in FIG. 17B is set at the magnifications ranging from 107 percent to 118 percent and from 132 percent to 143 percent.

The setting of the second achromatic color determination area 74 may be performed based on the scanning speed controlled at the magnification set when a user operates the image processing apparatus 1, or may be set based on the scanning speed controlled when a scanning resolution is automatically set by selecting a paper size. Further, since the generation state of the false colors regularly changes in accordance with the scanning speed as described above, by acquiring a displacement amount of the scanning position of each line sensor based on the intervals of the scanning positions that are changed in accordance with the scanning speed set by the scanning speed control unit 3, and by acquiring, based on the displacement amount, a generation amount of each false color by acquiring a displacement amount of each color component of the time when the scanned data of each color component is combined, the direction (inclination) in the longitudinal direction of the second achromatic color determination area 74 and the size of the area 74 can be set based on the acquired generation amount of the false colors.

The second achromatic color determination area 74 in the state illustrated in FIG. 17A enlarges the achromatic color determination area with respect to the first achromatic color determination area 73 to complement the mixed color of red (R) and yellow (Y) and the mixed color of blue (B) and cyan (C). The second achromatic color determination area 74 in the state illustrated in FIG. 17B enlarges the achromatic color determination area with respect to the first achromatic color determination area 73 to complement the mixed color of red (R) and magenta (M) and the mixed color of green (G) and cyan (C).

As illustrated in FIGS. 17A and 17B, in the second achromatic color determination area 74, distances "A" and "B", which extend in an opposite direction from the coordinate origin in the longitudinal direction, are set to be longer than distances "C" and "D", which extend in an opposite direction from the coordinate origin in a direction that is substantially perpendicular to the longitudinal direction of the second achromatic color determination area 74. The distances "A" and "B" may be equal or may be different. When the distances "A" and "B" are different, the shorter distance is set to be longer than the distances "C" and "D".

In the comparison unit 75 of the achromatic color determining unit 7, when the scanning position of each line sensor 21, 22, 23 matches, such as when the magnification is 100 percent, 125 percent, or 150 percent, the pixel data combined by the scanned data combining unit 6 is compared with the first achromatic color determination area 73, and the determination of being achromatic is performed. When the displacement is generated in the scanning positions, the pixel data combined by the scanned data combining unit 6 is compared with the second achromatic color determination area 74, and the determination of being achromatic is performed.

On the pixel data determined as achromatic or not by the achromatic color determining unit 7, achromatic or chromatic image processing is performed based on the determination result of the achromatic color determining unit 7 in the image processing unit 8. In other words, on the pixel data that has been determined as achromatic by the achromatic color determining unit 7, the achromatic image processing is performed by correcting, when the false color is generated, the false color portion to be achromatic. On the pixel data determined as chromatic by the achromatic color determining unit 7, the image processing is performed based on the determined chromatic color.

Further, the image processing unit 8 generates the image data by combining a plurality of pieces of pixel data on which the image processing has been performed. The generated image data may be stored in the image memory 9, or input into the printer 10 to record the image based on the image data on a sheet of paper. The printer 10 may include, for example, a photoconductive drum, a charger, a developing unit, a transfer unit, and a fixing unit, or the like.

In the above-described preferred embodiments, the second achromatic color determination area 74 is preferably set to be the areas illustrated in FIGS. 17A and 17B, however, the second achromatic color determination area 74 is not limited to the above-described setting. For example, the range of magnifications may be reduced, and the area 74 may correspond to each range. The area 74 may be set by changing, a little at a time, the shape, the size (length), and the direction (inclination) of the longitudinal direction of the second achromatic color determination area 74 based on the generation state of the false colors generated in each range, that is, based on the state of the mixed colors. Thus, by setting the second achromatic color determination area 74 by reducing the range of magnifications, the determination of achromatic color can be reliably performed.

Figure 18A:
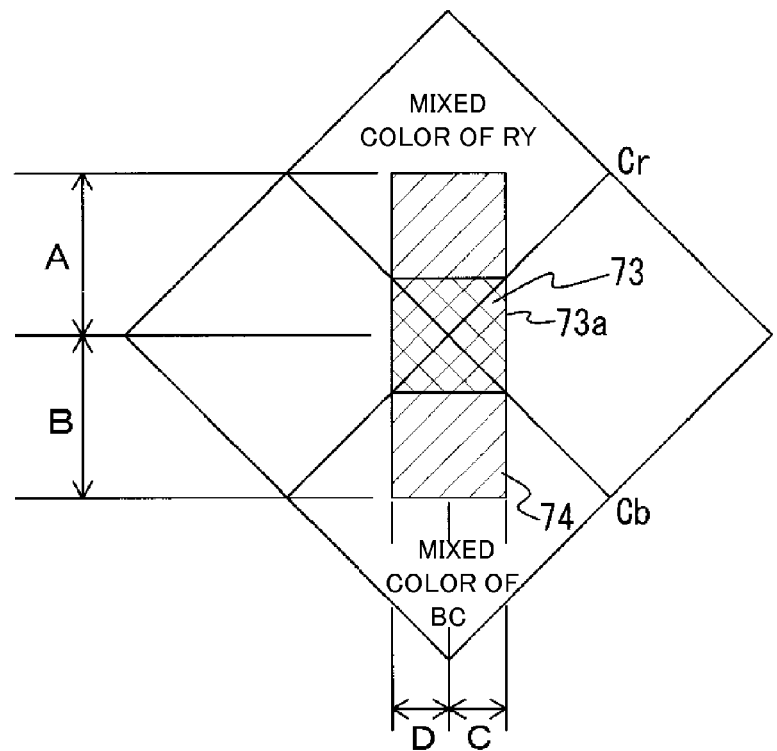
FIGS. 18A and 18B illustrate color space coordinates representing the second achromatic color determination area by rotating the color space coordinates by 45 degrees.
Figure 18B:
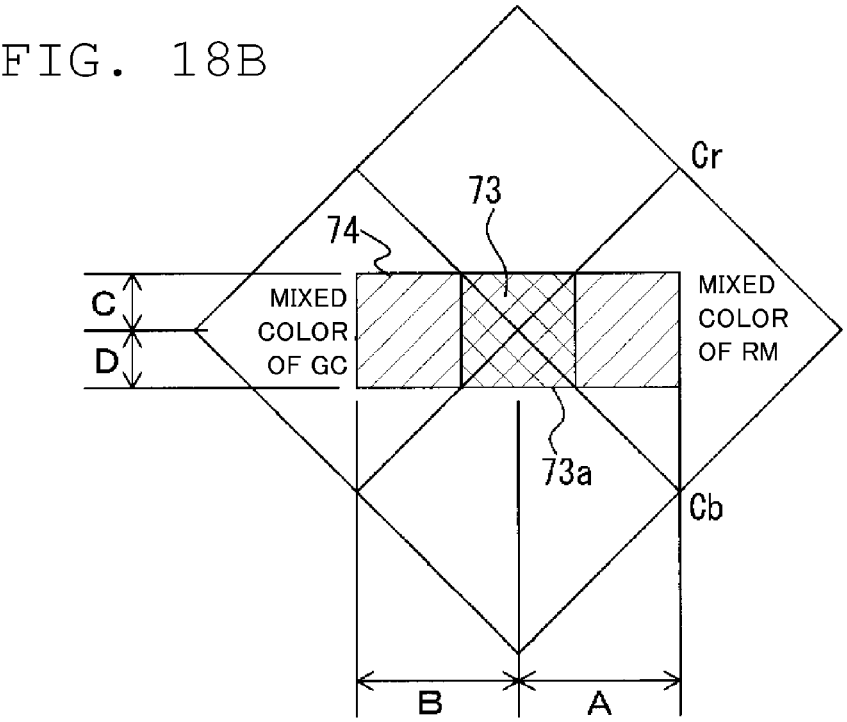

When setting the second achromatic color determination area 74, the determination of achromatic color may be performed by rotating the color space coordinates illustrated in FIGS. 17A and 17B by 45 degrees, and by setting the elongated second achromatic color determination area 74 illustrated in FIGS. 18A and 18B. In such a case, the color space coordinates is rotated based on a prescribed formula. Thus, by setting the second achromatic color determination area 74 to be elongated, the determination of achromatic color can be easily performed.

The generation state of the false colors changes in accordance with the scanning order of colors by the CCD, arrangement intervals of each CCD, and the scanning speed. Therefore, the achromatic color determination area is set in accordance with the above-described conditions. Furthermore, in the above-described preferred embodiments, each color component signal of the pixel data is converted into the first and second color-difference data, and the saturation distribution state is obtained by acquiring the orthogonal coordinates of the color space based on the color-difference data, however, the determination of achromatic color may be performed by using other color space coordinates.

While the present invention has been described with respect to preferred embodiments thereof, it will be apparent to those skilled in the art that the disclosed invention may be modified in numerous ways and may assume many embodiments other than those specifically set out and described above without departing the scope and spirit of the present invention. The scope of the present invention, therefore, is to be determined solely by the following claims.

What is claimed is:

1. An image processing apparatus comprising:
   an image scanning unit including a plurality of line sensors that correspond to different color components, the image scanning unit arranged to simultaneously scan different scanning positions on an original document at predetermined intervals in a sub-scanning direction;
   a scanning speed control unit arranged to control a scanning speed in the sub-scanning direction of the scanning positions based on a set scanning resolution;
   a scanned data combining unit arranged to combine, based on the scanning positions, each scanned data having a different color component from each scanned data output from the respective line sensors so as to generate pixel data;
   a color space conversion unit arranged to convert the pixel data into first chromaticity data and second chromaticity data; and
   an achromatic color determining unit arranged to determine whether or not the pixel data is achromatic; wherein
   the achromatic color determining unit includes a comparison unit arranged to compare an achromatic color determination area with the pixel data in a color space that is defined by orthogonal coordinates having the first chromaticity data and second chromaticity data as coordinate axes;
   the achromatic color determination area is an elongated area that includes a coordinate origin of the color space, that is set based on a coordinate position of a false color, and that extends in a direction substantially opposite from the coordinate origin; and
   the false color is acquired by using a size and position of displacement of the scanning position of each color component generated in accordance with the scanning speed.

2. The image processing apparatus according to claim 1, wherein an inclination in a longitudinal direction of the achromatic color determination area is changed based on the coordinate position of the false color acquired by using the size and position of the displacement of the scanning position of each color component generated in accordance with the scanning speed.

3. The image processing apparatus according to claim 1, wherein a length of the longitudinal direction of the achromatic color determination area is changed based on the coordinate position of the false color acquired by using the size and position of the displacement of the scanning position of each color component generated in accordance with the scanning speed.

4. The image processing apparatus according to claim 1, wherein the achromatic color determination area is arranged such that each distance that extends in an opposite direction from the coordinate origin in a longitudinal direction is longer than each distance that extends in an opposite direction from the coordinate origin in a direction that is substantially perpendicular to the longitudinal direction of the achromatic color determination area.

5. The image processing apparatus according to claim 1, wherein the scanning speed control unit is arranged to set the scanning speed to correspond to the set scanning resolution while maintaining a constant period of scanning in the sub-scanning direction.

6. An image processing apparatus comprising:
   an image scanning unit including a plurality of line sensors that correspond to different color components, the image scanning unit arranged to simultaneously scan different scanning positions on an original document at predetermined intervals in a sub-scanning direction;
   a scanning speed control unit arranged to control a scanning speed in the sub-scanning direction of the scanning positions based on a set scanning resolution;
   a scanned data combining unit arranged to combine, based on the scanning positions, each scanned data having a different color component from each scanned data output from the respective line sensors so as to generate pixel data; and
   an achromatic color determining unit arranged to determine whether or not the pixel data is achromatic; wherein
   the achromatic color determining unit determines whether or not the pixel data is achromatic based on a false color acquired by using a size and position of displacement of the scanning position of each color component generated in accordance with the scanning speed.

7. An image processing method comprising the steps of:
   controlling a scanning speed in a sub-scanning direction of scanning positions based on a set scanning resolution;
   combining, based on the scanning positions, each scanned data having a different color component from each scanned data output from a plurality of line sensors corresponding to different color components so as to generate pixel data;
   converting the pixel data into a first chromaticity data and a second chromaticity data; and
   determining whether or not the pixel data is achromatic; wherein
   the achromatic color determining step functions to:
      set, in a color space that is defined by orthogonal coordinates having the first chromaticity data and second chromaticity data as coordinate axes, an elongated area that includes a coordinate origin of the color space and that extends in an opposite direction from the coordinate origin, based on a coordinate position of a false color acquired by using a size and position of displacement of the scanning position of each color component generated in accordance with the scanning speed;
      set the elongated area as an achromatic color determination area; and
      compare the achromatic color determination area with the pixel data in the color space so as to determine an achromatic color.

* * * * *